(12) United States Patent
Rey et al.

(10) Patent No.: US 6,745,886 B1
(45) Date of Patent: Jun. 8, 2004

(54) MOTOR VEHICLE CLUTCH PEDAL VIBRATION ABSORBER

(75) Inventors: Frederéric Rey, Saint Gratien (FR); Giovanni Mosso, Santena (IT); Luca Federici, Collegno (IT)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/202,722

(22) PCT Filed: Apr. 23, 1998

(86) PCT No.: PCT/FR98/00807
§ 371 (c)(1),
(2), (4) Date: Sep. 26, 2001

(87) PCT Pub. No.: WO98/48212
PCT Pub. Date: Oct. 29, 1998

(30) Foreign Application Priority Data

Apr. 23, 1997 (FR) .............................. 97 05245

(51) Int. Cl.[7] .......................... F16L 55/04; F16D 48/02
(52) U.S. Cl. .................. 192/109 F; 60/469; 192/30 V
(58) Field of Search ...................... 192/109 F, 30 V; 138/30; 60/592, 469; 92/98 R, 169.1, 161, 60; 303/87

(56) References Cited

U.S. PATENT DOCUMENTS

| | | | | |
|---|---|---|---|---|
| 2,583,231 A | * | 1/1952 | Ragland | 138/30 |
| 4,301,908 A | * | 11/1981 | Fukuda et al. | 192/109 F |
| 4,427,029 A | * | 1/1984 | Charney et al. | 138/30 |
| 4,629,562 A | * | 12/1986 | Kercher | 138/30 |
| 4,742,998 A | * | 5/1988 | Schubert | 267/136 |
| 5,070,983 A | * | 12/1991 | Leigh-Monstevens et al. | 192/109 F |
| 5,161,864 A | * | 11/1992 | Cardenas et al. | 138/30 |
| 5,410,945 A | * | 5/1995 | Schops et al. | 92/98 R |
| 5,732,741 A | * | 3/1998 | Shiery | 138/30 |
| 5,779,019 A | * | 7/1998 | Grosspietsch et al. | 192/85 C |
| 5,816,046 A | * | 10/1998 | Paeth et al. | 60/469 |
| 6,101,811 A | * | 8/2000 | Nix et al. | 60/592 |
| 6,148,614 A | * | 11/2000 | Nix et al. | 60/592 |

FOREIGN PATENT DOCUMENTS

| | | | |
|---|---|---|---|
| DE | 19540753 C1 | * | 1/1997 |
| FR | 2442156 A1 | * | 6/1980 |
| FR | 2655128 A1 | * | 5/1991 |
| GB | 1562709 | * | 3/1980 |

* cited by examiner

Primary Examiner—Rodney H Bonck
(74) Attorney, Agent, or Firm—Liniak, Berenato & White

(57) ABSTRACT

The invention concerns a vibration absorber (7) with a housing (8) wherein is mounted a block of elastic material (22) defining a cavity (9) and sealingly closing it. The invention is applicable to motor vehicles.

8 Claims, 5 Drawing Sheets

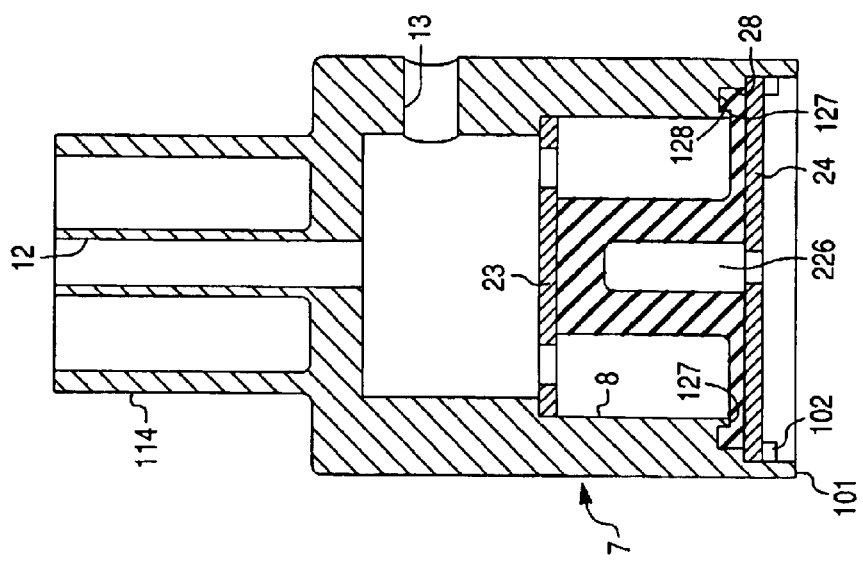
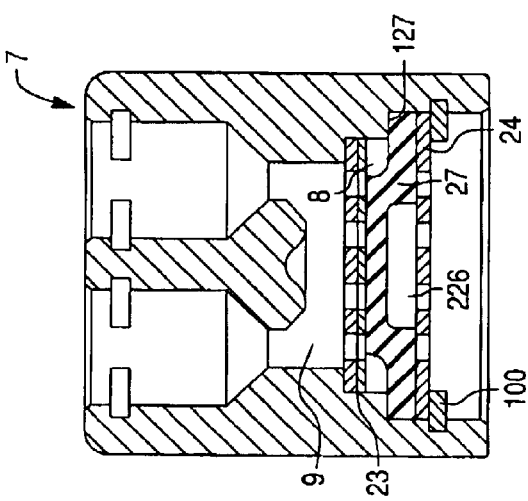
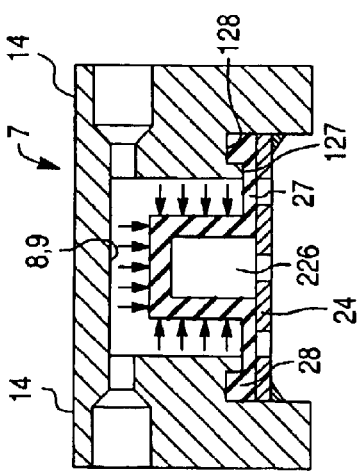
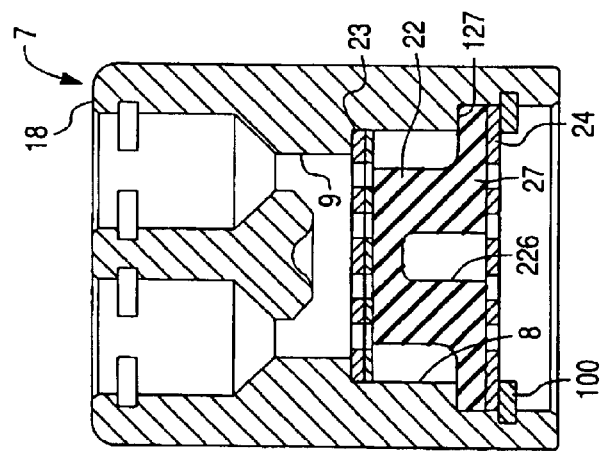

MOTOR VEHICLE CLUTCH PEDAL VIBRATION ABSORBER

The present invention concerns hydraulic control of motor vehicle clutches and in particular hydraulic vibration absorbers included therein.

A control system of the above kind is described in document FR-A-2 442 156.

In the above application the control device 1 (FIG. 1) includes a clutch pedal 2, a hydraulic sender 3 forming a master cylinder and a receiver 5.

In a manner that is known in itself the sender 3 includes a fixed cylinder in which a piston connected by a rod 31 to the clutch pedal 2 moves axially.

Here the upper part of the pedal is hinged at 20 to a fixed part of the vehicle.

A hydraulic pipe 4 connects the master cylinder 3 to the receiver 5 forming the cylinder actuating the clutch 29 of the motor vehicle, which includes a diaphragm 37, a cover 33, a pressure plate 38, a disc 41 and a reaction plate 30. The control fluid passes through this pipe. The receiver 5 is a mirror image of the sender and includes a fixed cylinder within which a piston connected by a rod 51 to a clutch release fork 6 moves axially, the fork acting in a manner that is known in itself on a clutch release thrust bearing 36 of the clutch 29 in contact with a diaphragm 37 in bearing engagement with a cover 33 to act on a pressure plate 38 in order to clamp the friction linings of a friction disc 41 between the pressure plate 38 and the reaction plate 30 of the clutch 29, forming a drive flywheel.

The cover is fixed to the reaction plate which is constrained to rotate with the crankshaft of the engine of the vehicle and the friction disc is constrained to rotate with the input shaft of the gearbox.

The receiver 5 therefore acts directly or indirectly on the clutch release abutment of the clutch 29 to operate said clutch driven by the engine of the vehicle.

For more information see document FR-A-2 730 532.

In the above document the receiver can include a piston acting directly on the clutch release thrust bearing, the receiver being of the concentric type and the input shaft of the gearbox passing through it.

In all cases the piston and the cylinder define a variable volume chamber.

When the clutch is released the sender is pressurised by the pedal 2 when it is depressed by the driver, the volume of the control chamber of the sender 3 is reduced and the volume of the control chamber of the receiver 5 is increased. The opposite happens when the clutch is engaged, the volume of the control chamber of the receiver decreasing and the volume of the control chamber of the sender increasing, said chamber then being depressurised.

Thus control fluid is transferred from one chamber to the other.

To release the clutch the driver presses the clutch pedal and vibration from the engine is transmitted to said pedal via the clutch release thrust bearing 36, the receiver 5, the pipe 4 and the sender 3.

This vibration is uncomfortable for the driver and varies with the rotation speed of the engine. It is particularly intense in vehicles with a diesel engine. The effect is amplified by the geometrical imperfections of the diaphragm 37, not all fingers of which are in the same plane because the diaphragm is frustoconical in the relaxed condition and undergoes heat treatment.

For this reason a hydraulic vibration absorber 10 is provided in the pipe 4. The hydraulic absorber 10 is fixed to a fixed part of the vehicle and absorbs fluctuations in hydraulic pressure coming from the receiver 5 and caused by vibration of the engine of the vehicle to prevent said fluctuations propagating to the sender 3 and therefore to the pedal 2.

To this end the pipe 4 is in two parts 4a and 4b respectively connected to the sender 3 and the vibration absorber 10 and to the receiver 5 and the vibration absorber 10.

The vibration absorber 10 has a hollow body with respective orifices connected to the parts 4a and 4b, for example in the form of pipes. The absorber 10 also includes, between the above two orifices, a cavity in which a piston reciprocates to compress and allow to expand a block of elastic material disposed outside it so as not to come into contact with the control fluid.

To this end the shouldered piston carries a seal and the elastic material block bears on the exterior of the body of the hydraulic absorber.

The above solution therefore requires a large number of components. Also, it is bulky in the heightwise (vertical) direction.

An aim of the present invention is to provide a simple and economic way to overcome the above drawbacks.

In accordance with the invention a vibration absorber of the type indicated above is characterised in that an elastic material block is mounted in a housing of the body of the vibration absorber and in that the cavity, forming a fluid chamber, is delimited by the elastic material block sealingly closing the cavity and bearing on an abutment fastened to the body of the vibration absorber.

The invention reduces the number of components because the elastic material block has a sealing function and a vibration absorbing function.

The heightwise overall size is also reduced and there is no piston that is bulky in the radial direction. The vibration absorber is therefore compact and economic.

In accordance with one feature of the invention the housing is shouldered for bearing engagement with a first pierced disc disposed between said cavity and the elastic material block. Because of the first disc the block is subjected to the action of the control fluid and can therefore absorb vibration directly. The damper is controlled by the holes in the first disc in conjunction with the stiffness of the elastic material block. The shouldered housing communicates with the cavity.

The first disc can therefore bear on the shoulder and to provide the seal the elastic material block is in intimate contact with at least a portion of the outside periphery of the housing, i.e. with a portion of the lateral face(s) of the housing.

Assembly is therefore simple and is effected by threading the components onto each other.

The abutment advantageously comprises a second disc with holes in it. The elastic material block has at least one recess facing a hole in the second disc to assure circulation of air and to control the deformation of the block. The block can be hat-shaped so that it deforms laterally (horizontally).

The second disc is held in place by a U-shaped pin the branches of which are engaged in passages provided for this purpose in the body of the absorber.

A different variant can use different means, for example an externally screwthreaded washer engaged with a screwthread in the internal bore of the housing.

In a further embodiment the second disc is glued, welded, crimped or clipped to the body of the absorber or fixed by a circlip.

The block between the first disc and the abutment can be pre-stressed. In all cases the hydraulic absorber forms an assembly that can be handled and transported and tested prior to installation.

The damper can be attached to the receiver or to the sender, in which case the pipe is in one part.

The damper does not need to be fixed to a fixed part of the vehicle. The first disc can be dispensed with.

Further advantages will become apparent in the following description referring to the accompanying drawings in which:

FIGS. 6 through 9 are views of further embodiments in axial section.

Figure 1:
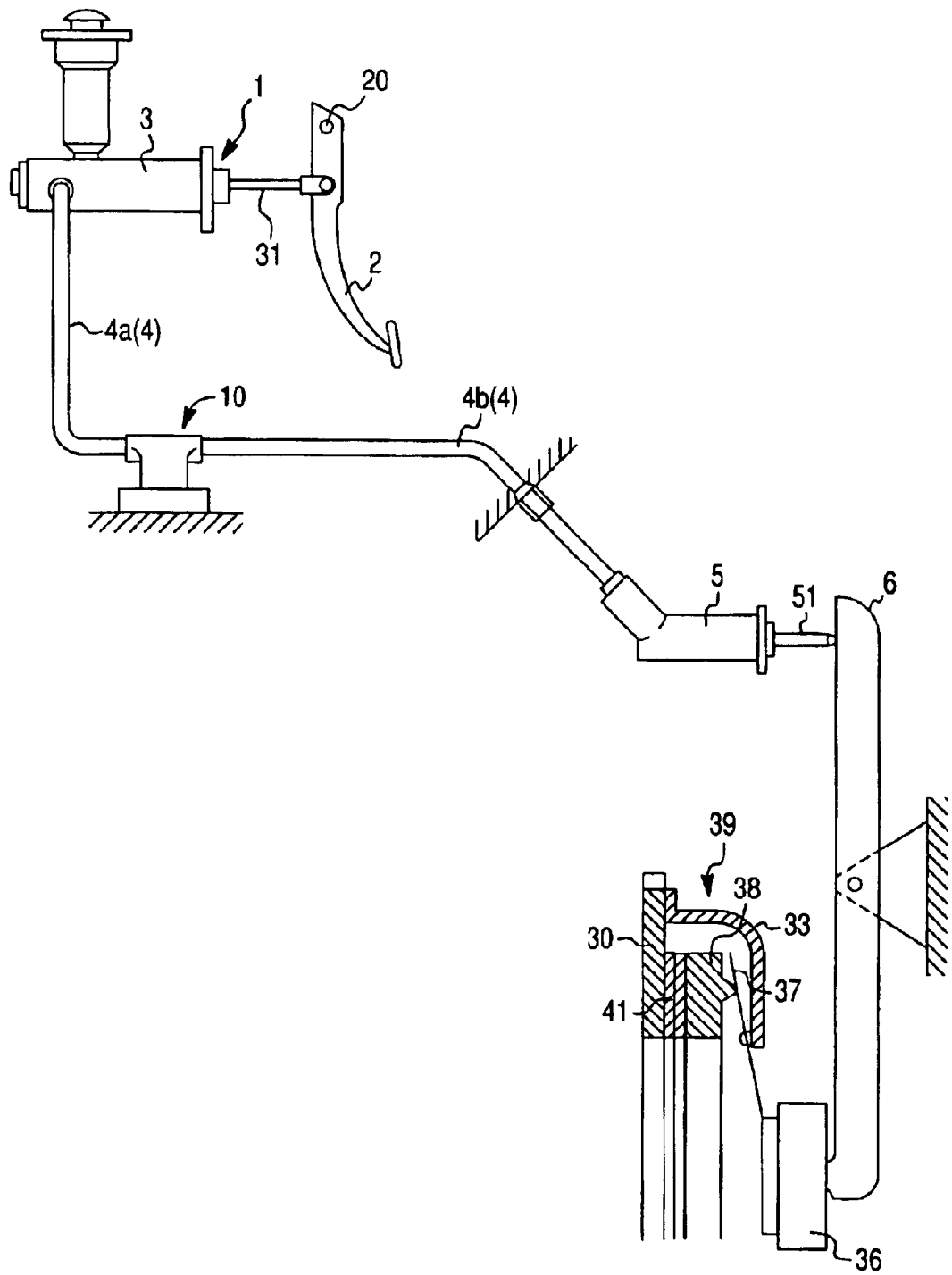
FIG. 1 is a diagrammatic view of a prior art hydraulic control system.

The clutch pedal absorber of the invention is substituted for the absorber from FIG. 1 in the figures. For simplicity the absorber is identified by the same reference number 10.

The absorber 10 has a hollow body 7 made from a material that can be moulded or cast, for example a plastics material or a material based on aluminium.

Figure 2:
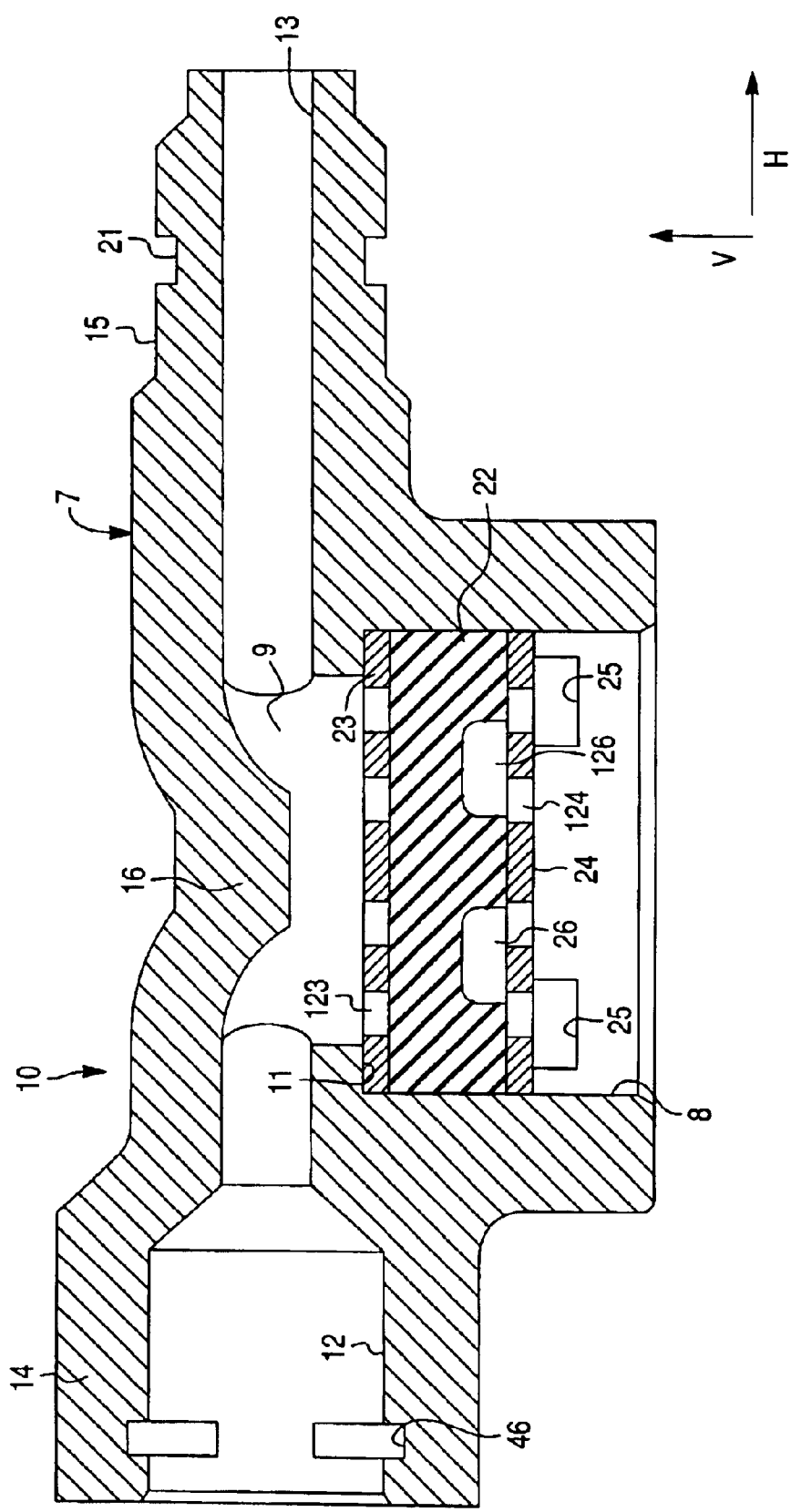
FIGS. 2 through 4 are views of various embodiments of a hydraulic absorber in accordance with the invention in axial section.
Figure 3:
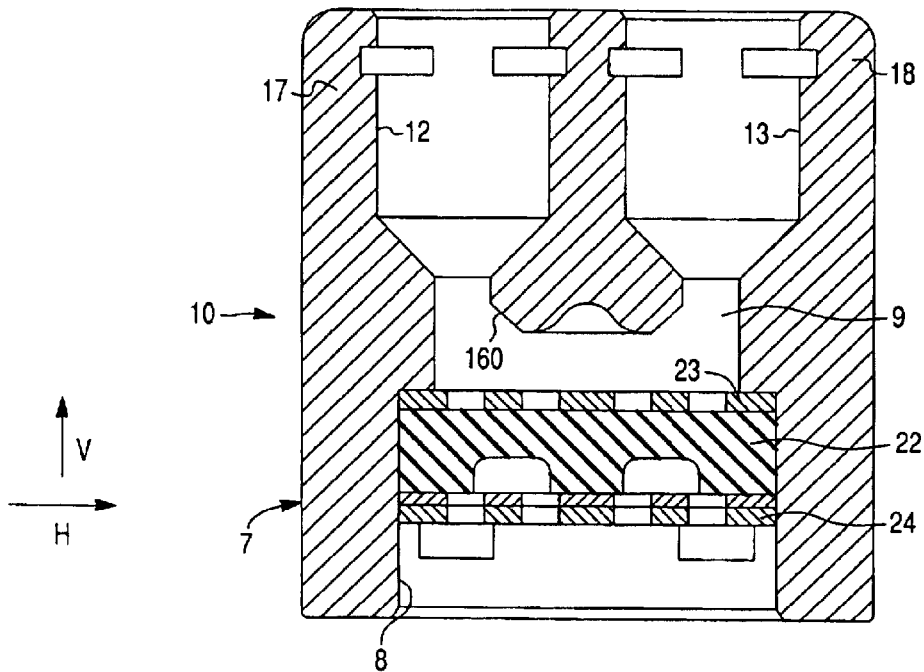
Figure 4:
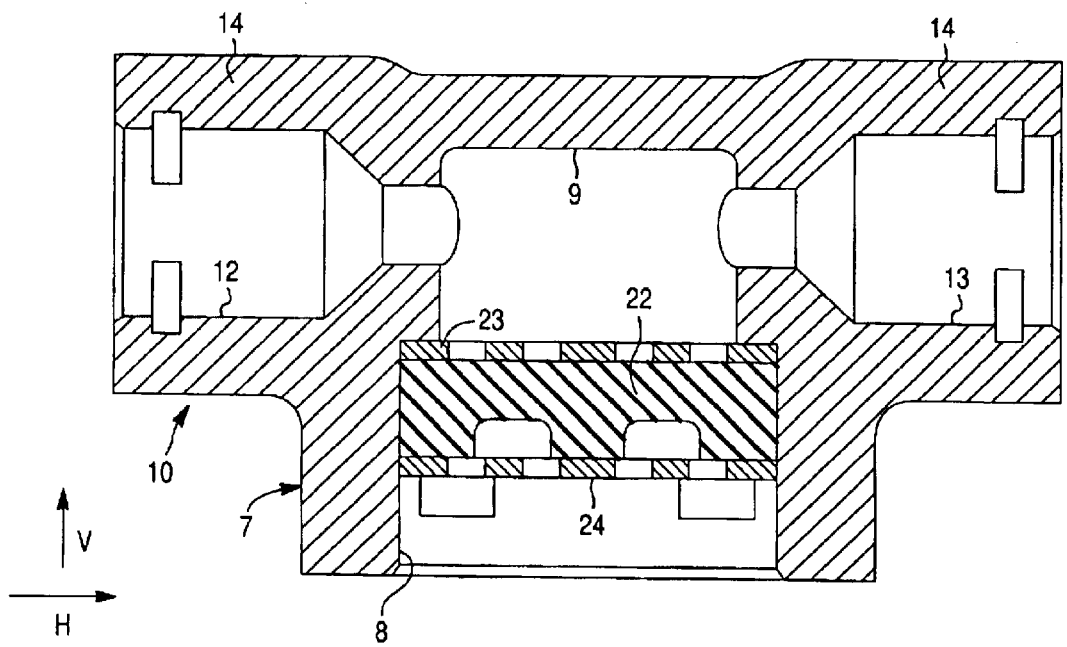

In FIGS. 2 through 4 the arrows V and H respectively represent the vertical and horizontal directions.

In FIGS. 2 through 4 the body 7 has a vertically oriented housing 8. This housing opens into a cavity 9 connected to orifices 12, 13 through which the control fluid flows.

A shoulder 11 delimits the housing 8 of the cavity 9.

The body 7 is therefore staggered in the vertical direction, the cavity 9 extending the housing 8 vertically and being smaller in the horizontal direction to delimit the shoulder 11.

The body 7 has a first orifice 12 and a second orifice 13 respectively adapted to be connected to the part 4a and the part 4b of the pipe 4 from FIG. 1.

The orifices 12, 13 are on respective opposite sides of the cavity 9, forming a fluid chamber, and form moulded in or cast in internal connecting passages. In FIG. 2 the orifice 12 is part of a female connector 14 and the orifice 13 is part of a male connector 15. The orifices 12, 13 are horizontally oriented.

The cavity 9 has a central protuberance 16 with symmetrical lateral sides profiled to form a chicane in the flow of the control fluid between the orifices 13, 12. Here the lateral sides are circular arc shape. Overall the body 7 is T-shaped.

In FIG. 3 the orifices 12 and 13 are parts of female connectors 17, 18. The control fluid flows through the body 7 in a U-shaped path.

To be more precise the connectors 17, 18 are vertically oriented and are vertically above the combination of the housing 8 and the cavity 9. The cavity 9 has a central protuberance 160 to form a chicane.

The lateral sides of the protuberance 160 are bevelled.

In FIG. 4 the orifices 12 and 13 are each part of a female connector 14 and there is no chicane in the cavity 9.

As in FIG. 2 the body 7 is T-shaped, the connectors 14 being horizontally oriented, as is the flow of the control fluid.

In a different embodiment the body 7 can have two male connectors. All combinations are possible.

The parts 4a and 4b naturally have connectors complementary to those at the orifices 12 and 13.

For example, the part 4a has a male connector at its end to engage inside the connector 14 from FIG. 2.

Each female connector 14, 17, 18 is associated with two passages 46 (FIG. 2). The male connector 15 has a groove 21 on the outside.

These arrangements are due to the fact that the feed branches operative between the vibration absorber 10 and the parts 4a and 4b of the pipe 4 are of the plug-in type, as described in document FR-A-2 736 136 for example.

Figure 5:
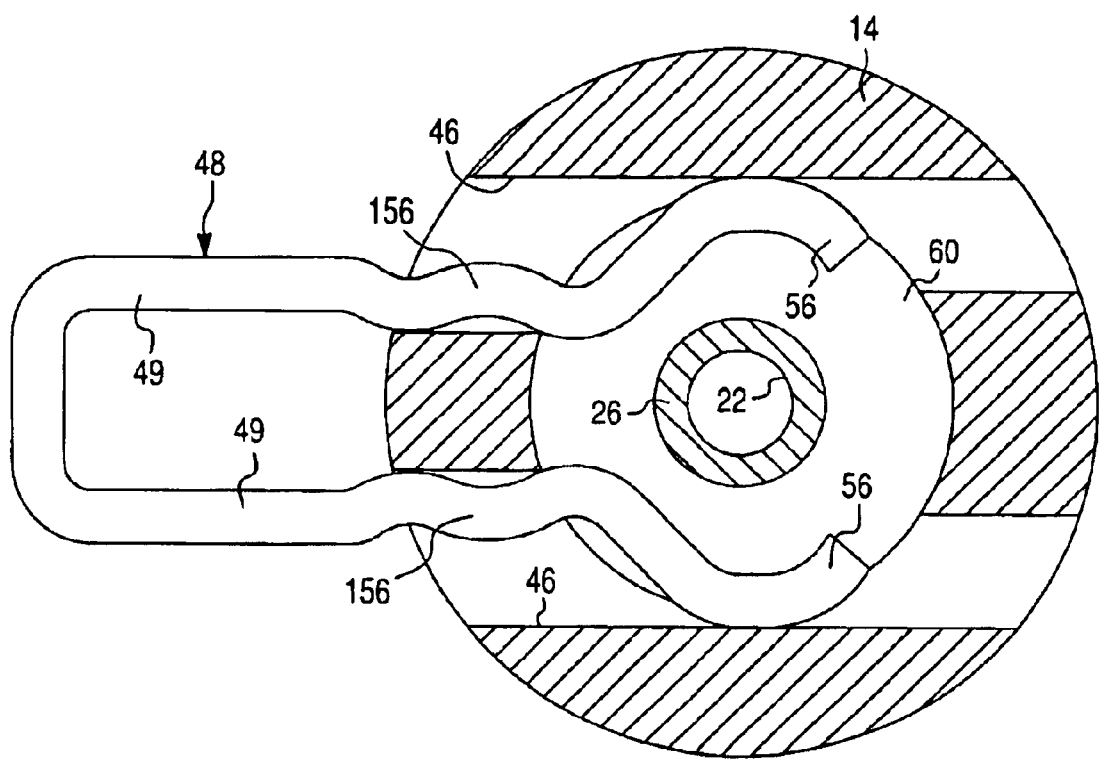
FIG. 5 is a sectional view of a feed branch.

For example, as shown in FIG. 5, the male connector 26 with the internal passage 22 of the part 4a is therefore held in axial engagement with the interior of the female connector 14 by a U-shaped transverse pin 48 two parallel branches 49 of which are each engaged in one transverse housing 46 of the connector 14. The two branches 49 co-operate with an external annular groove on the connector 26.

In FIG. 5 the transverse pin 48 is in an intermediate position and its enlarged end portions 56 co-operate with a radial flange 60 of the connector 26. The enlarged end portions 56 can be dispensed with.

In the fully pushed in locking position the recesses of curved intermediate parts 156 of the pin are clamped onto the connector 26, to be more precise onto the bottom of the groove on the connector 26.

The connector 14 can of course include a purge orifice and the connector 26 can have two grooves as described in the previously mentioned document FR-A-2 736 136.

In an alternative embodiment the feed branches can of course be of the screw type with a circlip or of other types.

In accordance with one feature of the invention an elastic material block 22 is mounted in and sealed into the housing 8 of the body 7.

Here the housing 8 is cylindrical in shape. The housing can have a rectangular section, the block 22 having a complementary rectangular section in this case. The block 22 is in intimate contact with the outside periphery of the housing 8 below the disc 23.

For simplicity the housing 8 and the block 22 have a circular section. The block 22 is made of natural rubber or of synthetic rubber obtained by polymerisation.

More generally, the block 22 is made from an elastomer material, which in the present context includes natural rubber. The material of the block 22 is chosen for compatibility with the control fluid, here the oil.

In FIG. 2 through 4 the block 22 is pre-stressed between a first disc 23 and a rear abutment in the form of a second disc 24. The first disc 23 is disposed between the cavity 9 and the block 22 in contact with the shoulder 11. The second disc is held in place in the housing 8 by a U-shaped pin.

The discs 23, 24 are pierced with holes. The first disc 23 adjacent the cavity 9 has holes 123 for access to the elastic block 22. The number and the size of the holes 123 depend on the application. The holes 123 can be calibrated holes if necessary.

Thus absorption of vibration is controlled by the holes 123 in conjunction with the stiffness of the block 22. The deformation of the block 22 is controlled by the holes 123.

Deformation of the block is encouraged by the fact that the block 22 has at least one recess 126.

In FIGS. 2 through 4 it has a plurality of recesses 126.

For simplicity the reference numbers 123, 126 and the reference numbers 124, 25 (referred to in the description below) are shown only in FIG. 2.

The recesses 126 are in corresponding relationship to the holes 124 in the second disc 124 to assure a flow of air. The recesses 126 are open on the side towards the disc 24 and the holes therein.

In service the block 22 is compressed and allowed to expand to absorb vibration. This is encouraged by the recesses 126 and the holes 124, which allow the air to escape.

The chicane formed by the protuberances 16, 160 produces an obstacle to the flow of the hydraulic clutch control fluid, e.g. oil, by directing it towards the block 22, which encourages absorption.

The chicane 16, 160 therefore limits the flow of the fluid and thus the propagation of waves. This attenuates the vibration.

The body 22 seals the body 7 and therefore has two functions.

Sealing is promoted by the second disc 24 which preloads the block 22 which flows into intimate contact with the bore of the housing 8. This assures a good seal.

In FIGS. 2 through 4 the block 22 is compressed radially.

In a different embodiment (see FIGS. 6 through 9 in which the components common to FIGS. 2 through 4 are identified by the same reference numbers) the elastic material (here elastomer) block 22 is compressed vertically and/or horizontally.

In the above figures the block 22 is mounted at least partly with clearance in its housing 8. There is lateral clearance between the contour of the housing and the block 22. The overall shape of the block 22 is that of a hat.

The central recess 226 of the hat opens onto the second disc 24. The disc 24 has holes in it to establish communication between the recess and the outside.

For simplicity the holes do not have reference numbers in the figures. In FIGS. 6 and 7 the disc 24 is fixed to the body 7 by a circlip 100.

In FIGS. 2 through 4 it is fixed using a pin (not visible) of the same type as that shown in FIG. 5. This is why there are steps 25 in the body 7, the steps 25 being analogous to the steps 46 in FIG. 5.

In FIGS. 2 through 4 the pin compresses the block 22 between the discs 23, 24.

In FIGS. 6 and 7 the circlip 100 compresses the rim 27 of the hat 22, which is annular in this embodiment, between the rear abutment 24 and a shoulder 127 of the housing 8. The block 22 is therefore in intimate contact with a portion of the outside periphery of the housing.

The shoulder 127 is formed by a change in the inside diameter of the housing 8. This provides a good seal.

The abutment 24, which is disc-shaped in FIGS. 6 through 9, can be made of metal or a plastics material. Likewise the first disc 23.

Note that in FIG. 6 and 7 the first disc 23 comprises a pair of discs the facing holes in which can be different sizes, if required.

In FIG. 8 the rear abutment is fixed by crimping. In this case the body 7 is made of metal and the material 101 of the body 7 flows during the crimping operation.

Afterwards this material forms a shoulder 102 shown in dashed outline.

In FIG. 9 the body 7 is metal and the rear abutment 24 is fixed by welding.

In FIGS. 2 through 4, 6 and 7 the abutment 24 can be removed.

In FIGS. 6 and 7 the block is deformed vertically and horizontally. These deformations are controlled by choosing the height and the diameter of the central part of the hat 22 and the size of the recess 226.

Specific deformation of the block can be achieved.

Thus in FIG. 6 the central part of the block 22 is higher than in FIG. 7 and is therefore more deformable in the horizontal direction.

In FIG. 8 horizontal deformation is favoured, the first disc 23 having no openings facing the top end of the block 22 in contact with the disc 23.

The holes are disposed laterally and in this case the central part of the block 22 is relatively high.

In FIGS. 6 through 8 the block is mounted with no pre-stressing between the abutment 24 and the disc(s).

The seal is provided by the rim 27 of the block 22, the vertically projecting central part of which is mounted centrally with clearance in the housing.

In a different embodiment (FIG. 9) the block is not pre-stressed and the first disc is dispensed with. To provide the seal the rim 27 has a bead 28 at its outside periphery. The bead 28 is vertically oriented and enters a groove 128 in the body 7. The groove 128 retains the block 22 laterally and is formed in the shoulder 127 in the housing 8.

In FIG. 9 the pressure exerted by the control fluid is represented by arrows.

Note that in FIG. 8, as in FIG. 9, a vertically oriented bead 28 enters a groove 128 in the shoulder 127 of the housing. A good seal is obtained in all circumstances despite horizontal deformation of the block.

The holes in the discs 23, 24 in conjunction with the stiffness of the block 22 provide controlled absorption.

The second disc 24 forms an abutment and can be welded, crimped or glued to the body 7 or fixed using a circlip.

In an alternative embodiment the disc is clipped into place.

Of course, an abutment of a different shape can be used instead of a second disc. For example, the abutment 24 can be a cover closing the rear end of the housing 8 and clipped onto the body 7.

In FIG. 8 the orifices 12, 13 are at 90°.

Accordingly the part 4b from FIG. 1 can be rigid and brazed to the orifice 13 of the body 7 and the part 4a from FIG. 1 can be flexible and engaged on the male connector 114 projecting vertically from the body 7.

The orifice 12 forms the central passage of the connector 114 and opens into the cavity 9.

The vibration absorber therefore constitutes a connector between the two parts of the pipe.

In a different embodiment the body 7 (and therefore the absorber 10) can of course be attached to the sender or the receiver of the hydraulic control system, i.e. the vibration absorber is not necessarily connected between two parts of a pipe.

The absorber 10 can be moulded or cast in one piece with the receiver or the sender.

The rear abutment 24 does not necessarily have holes in it, of course.

If it does not the recess or recesses in the elastic block form a gas accumulator.

The block 22 can then have a different deformation curve.

The holes in either the rear abutment or the first disc facilitate pre-stressing of the block 22, the material of which can flow into the holes.

In the FIG. 8 embodiment the elastomer block 22 is pre-stressed vertically for horizontal use of the block 22 due to the action of the pressure variations so as to assure a specific deformation curve.

In FIG. 9 the cavity 9 and the housing 8 are one and the same.

The orifices 12, 13 open into the cavity 9, the size of which depends on the application.

What is claimed is:

1. An absorber for vibrations of a clutch pedal forming part of a hydraulic clutch control comprising a transmitter (3), actuated by the clutch pedal and connected by a pipe (4)

to a receiver (5) acting on a clutch release bearing (36) of a motor vehicle clutch, comprising a body (7) provided with a cavity (9) intended to be connected to the hydraulic control comprising an actuating fluid, a block of elastic material (22) mounted in a housing (8) in the body (7) and the cavity (9), forming a chamber for said fluid, being delimited by the block of elastic material (22) sealingly closing off the cavity (9) and bearing on a stop (24) fixed to said body (7), wherein the housing (8) is provided with a shoulder on which there bears a first perforated disc (23), interposed between the cavity (9) and the block of elastic material (22).

2. An absorber according to claim 1, characterised in that the block of elastic material is mounted under prestressing between the stop (24) and the first disc (23).

3. An absorber according to claim 2, characterised in that the stop consists of a second perforated disc (24).

4. An absorber according to claim 3, characterised in that the block comprises at least one hollow (126, 226).

5. An absorber according to claim 4, characterised in that the stop (24) has at least one hole (124) for communicating with the said hollow.

6. An absorber according to claim 1, characterised in that the block is in the form of a cap.

7. An absorber according to claim 6, characterised in that the cap (22) has an edge (27) with a rim (128) entering a groove (128) provided in the body (8).

8. An absorber according to claim 1, characterised in that the cavity is provided with a baffle (16, 160) for directing the control fluid to the block of elastic material (22).

* * * * *